(12) United States Patent
Vyas et al.

(10) Patent No.: US 12,400,078 B1
(45) Date of Patent: Aug. 26, 2025

(54) INTERPRETABLE EMBEDDINGS

(71) Applicant: X Development LLC, Mountain View, CA (US)

(72) Inventors: Nisarg Vyas, Gujarat (IN); David Andre, San Francisco, CA (US)

(73) Assignee: GOOGLE LLC, Mountain View, CA (US)

( * ) Notice: Subject to any disclaimer, the term of this patent is extended or adjusted under 35 U.S.C. 154(b) by 434 days.

(21) Appl. No.: 17/706,303

(22) Filed: Mar. 28, 2022

Related U.S. Application Data (60) Provisional application No. 63/210,717, filed on Jun. 15, 2021.

(51) Int. Cl.
*G06F 40/284* (2020.01)
*G06F 18/2137* (2023.01)
*G06F 40/30* (2020.01)
*G06N 3/063* (2023.01)
*G06N 3/08* (2023.01)

(52) U.S. Cl.
CPC ........ *G06F 40/284* (2020.01); *G06F 18/2137* (2023.01); *G06F 40/30* (2020.01); *G06N 3/063* (2013.01); *G06N 3/08* (2013.01)

(58) Field of Classification Search
CPC .... G06F 40/284; G06F 40/30; G06F 18/2137; G06N 3/063; G06N 3/08
See application file for complete search history.

(56) References Cited

U.S. PATENT DOCUMENTS

2014/0376804 A1* 12/2014 Akata ............... G06F 18/21345
382/159
2019/0266487 A1* 8/2019 Chollet .................. G06V 20/00
(Continued)

OTHER PUBLICATIONS

Deng, C., Lai, G. and Deng, H. (2020), Improving word vector model with part-of-speech and dependency grammar information. Nov. 2, 2020, CAAI Trans. Intell. Technol., 5: 276-282. https://doi.org/10.1049/trit.2020.0055 (Year: 2020).*

(Continued)

*Primary Examiner* — Pierre Louis Desir
*Assistant Examiner* — Daniel W Chung
(74) *Attorney, Agent, or Firm* — Gray Ice Higdon (57) ABSTRACT

This specification is generally directed to techniques for creating reduced-dimensionality embeddings (e.g., embedding layers of neural networks) with dimensions that are interpretable by and/or are meaningful to humans. In various implementations, a datum may sampled from a document. A dimensionality reduction process may be performed based on the sampled datum to generate a semantically-interpretable embedding having a number of individually-interpretable dimensions. The dimensionality reduction process may include: analyzing the sampled datum according to a number of distinct semantic queries to determine respective numeric solutions. The number of distinct semantic queries may correspond to the number of individually-interpretable dimensions. Each numeric solution may offer an inconclusive clue about the sampled datum. The dimensionality reduction process may also include populating the dimensions of the semantically-interpretable embedding with respective numeric solutions.

18 Claims, 6 Drawing Sheets

(56) References Cited

U.S. PATENT DOCUMENTS

2020/0175360 A1* 6/2020 Conti .................. G06N 3/04
2023/0410471 A1* 12/2023 Highnam ............... G06V 10/82

OTHER PUBLICATIONS

Hwa Jong Kim, Seong Eun Hong, Kyung Jin Cha, seq2vec: Analyzing sequential data using multi-rank embedding vectors, Electronic Commerce Research and Applications, vol. 43, 2020, 101003, ISSN 1567-4223, https://doi.org/10.1016/j.elerap.2020.101003. (Year: 2020).*
Zeynep Akata, Florent Perronnin, Zaid Harchaoui, Cordelia Schmid, "Label-Embedding for Image Classification", Oct. 1, 2015, arXiv:150308677 [cs.CV] (Year: 2015).*
Lutfi Kerem Senel, Ihsan Utlu, Veysel Yucesoy, Aykut Koc, Tolga Cukur, "Semantic Structure and Interpretability of Word Embeddings", May 16, 2018, arXiv:1711.00331 [cs.CL] (Year: 2018).*
Viphavee Vongpumivitch, Ju-yu Huang, Yu-Chia Chang, "Frequency analysis of the words in the Academic Word List (AWL) and non-AWL content words in applied linguistics research papers", English for Specific Purposes, vol. 28, Issue 1, 2009, pp. 33-41, ISSN 0889-4906 (Year: 2009).*
Altmann, E.G., Whichard, Z.L. & Motter, A.E. Identifying Trends in Word Frequency Dynamics. J Stat Phys 151, 277-288 (2013). https://doi.org/10.1007/s10955-013-0699-7 (Year: 2013).*
Gerritsen, M., Jansen, F. (1980). Word Frequency and Lexical Diffusion in Dialect Borrowing and Phonological Change. In: Geerts, G., et al. Dutch Studies. Springer, Dordrecht. https://doi.org/10.1007/978-94-009-8855-2_3 (Year: 1980).*
Liu, Pengfei et al. "Learning Context-Sensitive Word Embeddings with Neural Tensor Skip-Gram Model." International Joint Conference on Artificial Intelligence (2015). (Year: 2015).*
Senel et al., "Semantic Structure and Interpretability of Word Embeddings" arXiv:1711.00331v3 [cs.CL] dated May 16, 2018. 11 pages.
Subramanian et al., "SPINE: SParse Interpretable Neural Embeddings" 32nd AAAI Conference of Artificial Intelligence (AAAI-18). 8 pages.
Gupta et al., "SEMIE: SEMantically Infused Embeddings with Enhanced Interpretability for Domain-specific Small Corpus" arXiv:2103.11431v1 [cs.CL] dated May 21, 2021. 9 pages.
Panigrahi et al., "Word2Sense: Sparse Interpretable Word Embeddings" Microsoft Research India. 14 pages.
Templeton "Inherently Interpretable Sparse Word Embeddings through Sparse Coding" arXiv:2004.13847v1 [cs.CL] dated Apr. 8, 2020. 18 pages.
Zhang et al., "Word Embedding Visualization Via Dictionary Learning" arXiv:1910.03833v2 [cs.CL] dated Mar. 15, 2021. 14 pages.
Dufter et al., "Analytical Methods for Interpretable Ultradense Word Embeddings" arXiv:1904.08654v2 [cs.CL] dated Sep. 13, 2019. 10 pages.
Senel et al., "Imparting Interpretability to Word Embeddings while Preserving Semantic Structure" arXiv:1807.07279v4 [cs.CL] dated Jul. 2, 2020. 15 pages.
Qureshi et al., "EVE: Explainable Vector Based Embedding Technique Using Wikipedia" arXiv:1702.06891v1 [cs.CL] dated Feb. 22, 2017. 22 pages.
Jiang et al., "Language as an Abstraction for Hierarchical Deep Reinforcement Learning" arXiv:1906.07343v2 [cs.LG] dated Nov. 18, 2019. 25 pages.

* cited by examiner

INTERPRETABLE EMBEDDINGS

BACKGROUND

In order to be processed by computers, data such as words and images may be encoded as intermediate representations often referred to as "embeddings" (e.g., real-valued vectors, also referred to as "intermediate representations) that represent various attributes of the data in fewer dimensions. In many cases, these embeddings are created and/or processed using machine learning models and/or artificial intelligence algorithms. With neural network architectures, for instance, an embedding may constitute a mapping of a variable or entity into a vector of continuous numbers. In the image domain, for instance, an image of one resolution (e.g., 1024×768) may be reduced to an embedding of lower resolution (e.g., 192×1). The dimensionality reduction process is typically performed using techniques such as an autoencoder, principal components analysis (PCA), t-Distributed Stochastic Neighbor Embedding (t-SNE), etc.

A procedure for generating embeddings from data samples (e.g., words, images) often may be implemented as follows. The data sample may be first identified. If the data sample is a word, this may include tokenizing the word. If the data is categorical (e.g., an image), a one-hot vector may be encoded that includes a dimension for each of the categories. These categories are not necessarily assigned in any particular order—e.g., similar categories are not necessarily closer to each other. Even if the data is not categorical, a one-hot vector may still be created. For example, in some natural language processing algorithms, each unique word is given its own "category" while creating the one-hot vector. Whichever the case, for "N" such categories, an N×1 dimensional vector is created for each data sample. In many cases, a one-hot vector may have millions of dimensions.

These vectors (one-hot or otherwise) may then be processed using various dimensionality reduction techniques (e.g., autoencoder, PCA, t-SNE, etc.) to generate semantically-rich embeddings. However, while these semantically-rich embeddings are capable of being processed by a computer, e.g., using machine learning and/or artificial intelligence to determine similarity measures with other embeddings, these embeddings may not be interpretable by humans. For example, individual dimensions of the embedding may be meaningless to humans. This makes various data science tasks, such as debugging downstream processes, quite difficult.

SUMMARY

This specification is generally directed to techniques for creating reduced-dimensionality embeddings (e.g., embedding layers of neural networks) with dimensions that are semantically interpretable by and/or are meaningful to humans. Forcing these embedding dimensions to be semantically interpretable may aid in debugging, e.g., for downstream tasks performed using the interpretable-embeddings, and may also allow for provision of key interpretable examples for various downstream tasks.

In various implementations, a data sample may be processed using techniques described herein to generate an interpretable embedding with some number of individually-interpretable dimensions. Each individually-interpretable dimension may correspond to a distinct semantic query to which a numeric solution can be ascertained for the data sample. Put another way, each distinct semantic query may constitute a question about the data sample, and the numeric solution may be an answer to the question (similar to the game of "twenty questions", except there may be as many semantic queries/numeric solutions about the data sample as desired). The dimensions of the interpretable embedding may be populated with these numeric solutions. Consequently, even if the interpretable embedding's dimensions are reduced further, e.g., for one or more downstream tasks, so long as those dimensions can be reconstructed and those numeric solutions decoded, it is possible for a human to interpret the embedding in terms of the numeric solutions to the semantic queries. Thus, for instance, the human is able to debug various downstream processes more effectively because they are able to ascertain whether the semantic meaning expected from the interpretable embedding matches the reality.

A data sample may take various forms. In some implementations, a data sample may be a standalone document such as a digital image, a digital video, a word processing file, a webpage, an audio file, etc. Additionally or alternatively, in some implementations, a data sample may take the form of a datum sampled from a larger document. Such a sampled datum may take various forms, including but not limited to a token (e.g., a word) in a document, a frame of a video, an individual track of an audio file, or any other piece of data that can be extracted from a document and which has its own, standalone semantic meaning (e.g., can be semantically queried using techniques described herein to generate an interpretable embedding).

In various implementations, each numeric solution may be an inconclusive clue about the data sample. In other words, in many implementations, individual numeric solutions do not conclusively identify the data sample, but instead provide a clue about the data sample. In implementations in which the data sample takes the form of a word-token, numeric solutions may include, but are not limited to, a probability that the token should be assigned a particular part of speech, a frequency at which the token would be found in a category of literature (e.g., fiction, non-fiction, horror, fantasy, self-help, financial, scientific, etc.), a frequency at which the token would be found in literature authored during a particular period of time (e.g., a decade, a century), a frequency that the token occurs in a particular dialect (e.g., UK English versus American English versus Irish English) or language, a number of meanings assigned to the token, a number of vowels or consonants in the word, to name a few.

In various implementations, numeric solutions to distinct semantic queries that provide inconclusive clues about data samples may be answerable automatically, avoiding (or at least reducing) human intervention, which can be costly. For example, a large corpus of text may be analyzed using various techniques to generate statistics about individual words/tokens, such as how often they appear in particular categories of literature, probabilities the words/tokens are being used to express particular sentiments, the probability the word is used as a noun or verb in a sentence, and so forth. Additionally or alternatively, some semantic queries may be innately answerable without much pre-processing. For example, the number of vowels in a word can be determined based on classifications of individual letters.

An interpretable embedding generated in accordance with the present disclosure may be used on its own, or it may be used in conjunction with other, less interpretable and/or more conventional embeddings. For example, in some implementations, a one-hot vector may be generated for a data sample, and that one-hot vector may have its dimensions reduced, e.g., using an encoder portion of an autoencoder, PCA, etc., to generate a non-interpretable or "latent" embedding. Meanwhile, numeric solutions to various semantic queries may also be determined for the data sample to generate an interpretable embedding. In some implementations, the latent embedding and the interpretable embedding may be combined, e.g., using techniques such as concatenation, to generate a combined embedding that can then be processed using various downstream processes. So long as the interpretable portion of the combined embedding can be reconstructed, it is possible to ascertain the clues about the original data sample encoded into the numeric solutions, and hence, it is possible to interpret the combined embedding.

Interpretable embeddings generated using techniques described herein may provide a variety of technical benefits beyond improved debugging. Having the ability to formulate semantic queries to which numeric solutions can be ascertained may allow for improved feature selection and/or weighting when interpretable embeddings are used in deep learning applications. For example, attention-based mechanisms can be used to draw attention to a sub-portion of a neural network that is associated with particular classes of interpretable embeddings.

In some implementations, multiple hidden (and interpretable) embedding layers of a neural network may be "tapped" to generate what will be referred to herein as "domain-specific" language for each hidden embedding layer. For example, visual data such as images are often analyzed as a hierarchy, e.g., using a convolutional neural network. Earlier hidden embedding layers may be rendered interpretable—e.g., concatenated with an interpretable embedding—using techniques described herein to convey relatively abstract visual concepts, such as lines, curves, etc. Later hidden embedding layers may be rendered interpretable using techniques described herein to convey less abstract visual concepts, such as whole shapes (e.g., square, circle), whether the depicted subject has a tail, stands upright, etc.

In some implementations, a method for generating a semantically-interpretable embedding may be implemented using one or more processors and may include: obtaining a datum sampled from a document; performing a dimensionality reduction process based on the sampled datum to generate a semantically-interpretable embedding having a number of individually-interpretable dimensions, wherein the dimensionality reduction process includes: analyzing the sampled datum according to a number of distinct semantic queries to determine respective numeric solutions, wherein the number of distinct semantic queries corresponds to the number of individually-interpretable dimensions, and wherein each numeric solution offers an inconclusive clue about the sampled datum, and populating the dimensions of the semantically-interpretable embedding with respective numeric solutions; and providing, at an output device, output conveying information determined about the sampled datum from the semantically-interpretable embedding.

In various implementations, the sampled datum may include a token corresponding to a word of the document. In various implementations, the numeric solutions may include one or more probabilities that the token should be assigned one or more parts of speech, respectively. In various implementations, the numeric solutions may include one or more frequencies at which the token is found in one or more categories of literature, respectively. In various implementations, the numeric solutions may include one or more frequencies at which the token is found in literature authored during one or more periods of time, respectively. In various implementations, the numeric solutions may include one or more frequencies that the token occurs in one or more dialects, respectively. In various implementations, the numeric solutions may include a number of meanings assigned to the token. In various implementations, the numeric solutions may include one or more frequencies at which the token would be found in one or more categories of literature, respectively.

In various implementations, the document may include a video and the sampled datum comprises an individual video frame. In various implementations, the sampled datum may be represented as a one-hot vector. In various implementations, the method may include combining an additional embedding with the semantically-interpretable embedding, wherein the additional embedding includes latent data that is generated based on the one-hot vector using the same dimensionality reduction process or a different dimensionality reduction process. In various implementations, the method may include debugging a process that relies on the semantically-interpretable embedding, wherein the debugging includes: decoding a downstream encoding of the combined additional embedding and semantically-interpretable embedding to reconstruct the numeric solutions, wherein the downstream encoding has fewer dimensions than the combined additional embedding and semantically-interpretable embedding.

In addition, some implementations include one or more processors of one or more computing devices, where the one or more processors are operable to execute instructions stored in associated memory, and where the instructions are configured to cause performance of any of the aforementioned methods. Some implementations include at least one non-transitory computer readable storage medium storing computer instructions executable by one or more processors to perform any of the aforementioned methods.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1:
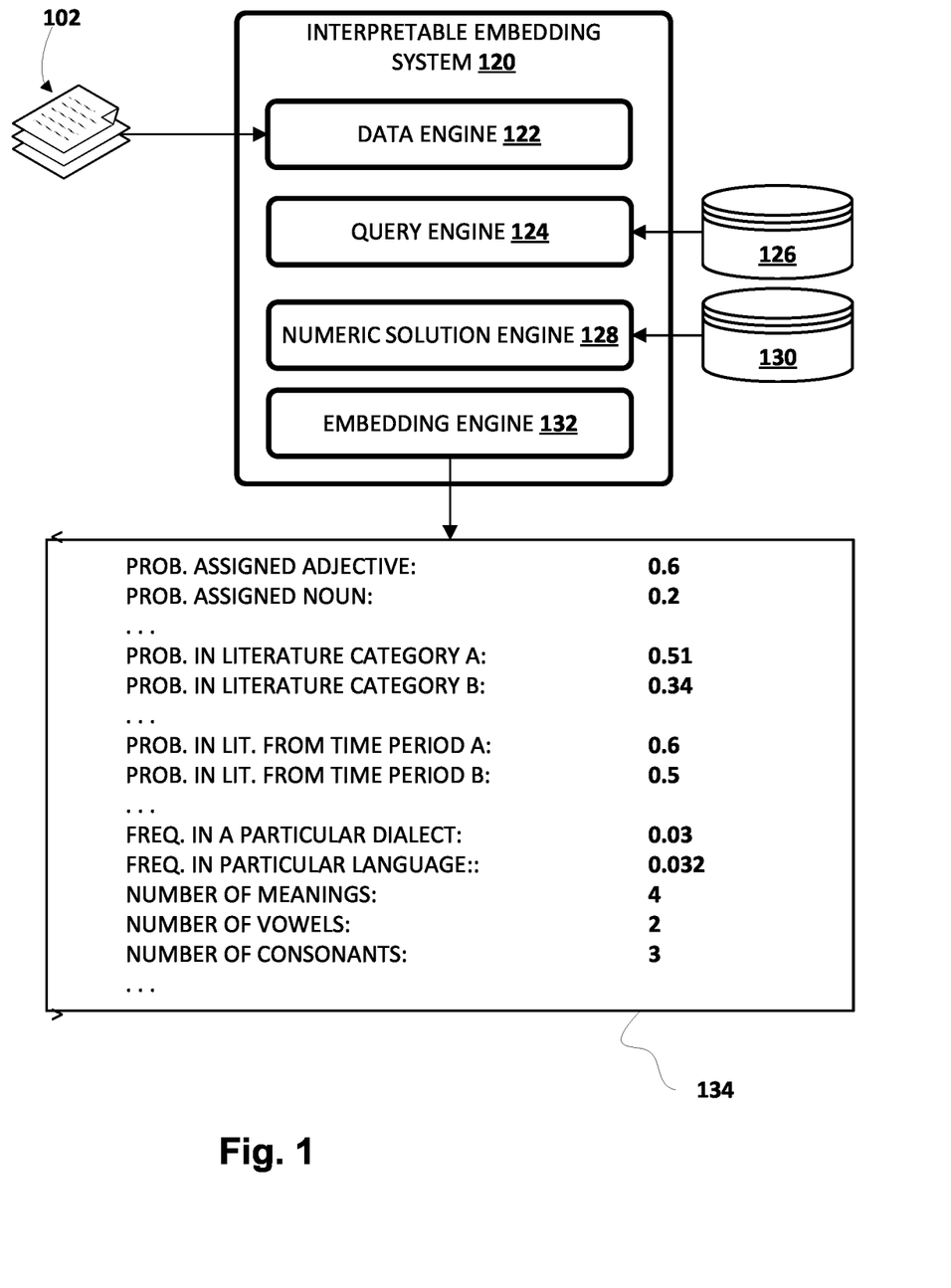
FIG. 1 is a diagram of an example environment in which implementations disclosed herein may be implemented.

In FIG. 1, an example environment in which techniques disclosed herein may be implemented is illustrated. The example environment includes an interpretable embedding system 120 that is configured in accordance with the present disclosure. To this end, interpretable embedding system 120 may include various engines, implemented using any combination of hardware and software that are configured to perform selected aspects of the present disclosure. For example, in FIG. 1, interpretable embedding system 120 includes a data engine 122, a query engine 124, a numeric solution engine 128, and an embedding engine 132. In various implementations, one or more of engines 122, 124, 128, and/or 132 may be omitted and/or combined with other of engines 122, 124, 128, and/or 132. In various implementations, interpretable embedding system 120 may be distributed across one or more computing systems, e.g., as a "cloud-based" system.

Data engine 122 may be configured to receive and/or preprocess input data 102 into a form that can be processed by downstream component(s). For example, data engine 122 may receive and preprocess one or more documents forming input data 102 to generate one or more feature vectors that represent constituent components of input documents and/or input documents in their entirety. Input data 102 may come in various forms, including but not limited to textual documents, digital images, audio files, videos (with or without accompanying audio), speech recognition output (e.g., natural language text), programming language source code, and so forth. Input data 102 may also be multi-modal, such as audio with accompanying text, video with accompanying captions, video with natural language description, etc.

Data engine 122 may preprocess input data 102 in various ways, depending on a variety of factors such as an intended downstream use of an interpretable embedding generated using techniques described herein, a domain to which input data belongs 102 (e.g., textual data, imagery, fiction, non-fiction, etc.), and so forth. In some implementations, data engine 122 may encode all or aspect(s) of input data 102 into feature vectors. These feature vectors may take various forms depending on the nature of input data 102. For instance, multi-word textual snippets such as whole textual documents, text excerpts, natural language, etc., may be encoded into bag(s)-of-words. As another example, data such as images and/or individual words/tokens, may be encoded into one-hot vectors.

Query engine 124 may be operably coupled with (e.g., have direct or indirect access to) one or more databases 126 of semantic queries. Each semantic query may represent a human-understandable question about input data 102, such as a question about a whole document (e.g., a digital image) and/or a constituent component of a document (e.g., individual tokens of textual input). In various implementations, query engine 124 may be configured to select which semantic queries are going to be applied to input data 102 that is preprocessed by data engine 122.

Query engine 124 may select semantic queries to be applied dependent on a variety of different factors. Downstream processing tasks and/or constraints, for instance, may dictate that certain semantic queries and/or combinations thereof (as well as their respective numeric solutions) may be more effective than others. As another example, debugging practice downstream may dictate that certain semantic queries and/or combinations thereof may be more effective than others. In some implementations, query engine 124 may select one or more semantic queries based on a subject matter domain in which an interpretable embedding is going to be used. Additionally or alternatively, in some implementations, query engine 124 may select one or more semantic queries based on attributes of input data 102, such as structural attributes (e.g., imagery versus text, color versus black and white imagery), upstream classification (e.g., sentiment analysis), quantity of input data 102, a source of input data 102 (the source may have numeric solutions to some semantic queries available), and so forth.

Numeric solution engine 128 may be operably coupled with one or more databases 130 that contain numeric solutions to semantic queries and/or information that can be used to obtain and/or ascertain numeric solutions to semantic queries. In various implementations, numeric solution engine 128 may determine numeric solutions to the semantic queries selected by query engine 124. Numeric solution engine 128 may obtain numeric solutions in various ways.

In some implementations, numeric solution engine 128 may simply look up and/or fetch pre-calculated numeric solutions, e.g., from table(s) in database(s) 130. These pre-calculated numeric solutions may have been determined previously. In the textual domain, for instance, a large corpus of textual documents may be analyzed to determine various statistics about individual words. These statistics may include, but are not limited to, how frequently individual words are used in particular categories of literature, in literature from different epochs (e.g., decades, centuries, periods in which different literary styles were popular/widely-used, etc.), how many meanings words have, how frequently those multiple meanings are used relative to each other, how frequently words are assigned different parts of speech, how many vowels/consonants words have, and so forth.

Additionally or alternatively, in some implementations, numeric solution engine 128 may calculate numeric solutions, e.g., in real time. Suppose input data 102 includes images depicting objects that are to be recognized. In some implementations, numeric solution engine 128 may process the images using a high-level/coarse machine learning model that is trained to determine probabilities that depicted objects fall into relatively broad categories, such as "living thing," "non-living thing," "animal," "plant," "man-made," "natural," and so forth. The probabilities calculated for these broad categories may be used, for instance, as inconclusive clues to narrow a search space for downstream object recognition. Likewise, those categories may correspond to (and be used as) semantic queries, and the probabilities may correspond to (and may be used as) respective numeric solutions that are included in dimensions of interpretable embeddings.

Numeric solutions to semantic queries are not limited to probabilities. Other categorical and/or statistical numeric solutions may be used to populate dimensions of interpretable embeddings as well. In the image domain, these other numeric solutions may include, for instance, a range of colors containing a majority of pixels depicting the object-to-be-recognized (or the image as a whole), a mean value of all colors of the depicted object to be recognized (or the image as a whole), etc. For example, a semantic query may be, "what color is the depicted object?" The numeric solution may be a range of numeric values corresponding to a range of colors, or may identify a bin (e.g., "orange," "blue," "brown," etc.) to which multiple similar colors are mapped. Additionally or alternatively, in some implementations, a numeric solution may simply be a binary value (e.g., zero or one) that signifies that something does or does not belong in a category, or satisfy a criterion.

In other implementations, a numeric solution used to populate a dimension of an interpretable embedding may itself take the form of a feature vector and/or embedding. This feature vector or embedding may be mapped to or otherwise associated with some human-interpretable semantic concept. For example, an embedding that is used to populate a dimension of an interpretable embedding may itself represent a coordinate in latent space. That coordinate in latent space may be part of a cluster of embeddings in latent space that share one or more attributes. The cluster's attribute(s) may be inconclusive clues about data samples, and hence, may be used to generate numeric solutions to semantic questions of whether data samples have the attribute(s).

Referring back to FIG. 1, embedding engine 132 may be configured to generate an interpretable embedding 134 based on the numeric solutions determined by numeric solutions engine 128. Interpretable embedding 134 is depicted in FIG. 1 as including both semantic queries on the left and corresponding numeric solutions on the right. In this example, interpretable embedding 134 represents a word. First and second dimensions of interpretable embedding 134 are populated with numeric solutions (probabilities in this case) to two corresponding parts-of-speech semantic queries, namely, "Probability the word is assigned to the adjective category" and "Probability the word is assigned to the noun category." As indicated by the ellipses, any number of additional dimensions of interpretable embedding 134 may be populated with numeric solutions regarding other candidate parts-of-speech.

Two additional dimensions are populated with probabilities that the word would be found in first and second categories of literature, respectively. Categories of literature may include, but are not limited to, fiction, non-fiction, fantasy, horror, science fiction, historical fiction, scientific, periodical, comedy, and political, to name a few. As indicated by the ellipses, interpretable embedding 134 may include any number of dimensions corresponding to any number of literary categories.

Two additional dimensions are populated with probabilities that the word would be found in literature from two different time periods, respectively. Time periods of literature may be delineated into any time period or epoch where various stylistic choices, word choices, dialects, phrases, grammar, tone, etc., are used more or less commonly than in other time periods. For example, literature from the time of Shakespeare would be more likely than other epochs to include phrases like "thou art <something>." As another example, as political norms and customs evolve over time, some words and/or phrases may become anachronistic and/or go out of favor—such words may have higher probabilities of being found in older literature as compared to newer literature. As indicated by the ellipses, interpretable embedding 134 may include any number of dimensions corresponding to any number of time periods of literature.

In addition to the aforementioned probabilities, frequencies at which the word may be found in certain circumstances, such as in a particular dialect (e.g., Irish English versus American English versus British English) and/or in a particular language, are also used as numeric solutions to populate dimensions of interpretable embedding 134. Another dimension of interpretable embedding 134 is populated with a number (e.g., a count) of meanings the word has. This numeric solution may be ascertained, for instance, by analyzing one or more dictionaries. Other dimensions of interpretable embedding 134 include number of vowels and number of consonants. These dimensions depicted as part of interpretable embedding 134 are not meant to be limiting, and are for illustrative purposes only.

At least some of the numeric solutions in interpretable embedding 134 may be inconclusive—one of those numeric solutions may not, by itself, conclusively identify the word that was used to generate interpretable embedding 134. Rather, these numeric solutions may operate as clues or guideposts that each narrow down the search space of all potential words. When dimensions of interpretable embedding 134 are reduced, e.g., for downstream machine learning processing, that reduced version of interpretable embedding 134 may be decoded, in whole or in part, to reconstruct these numeric solutions. If any of the numeric solutions differ from their expected values, a human may spot this and may use the "wrong" dimension for debugging purposes.

Figure 2:
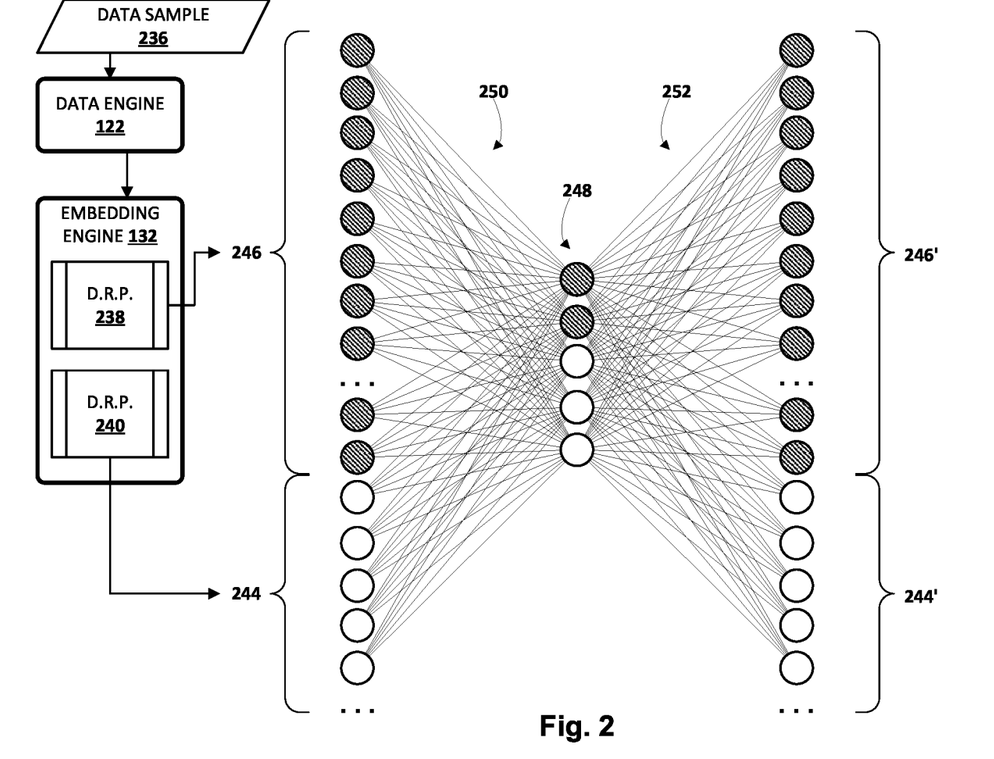
FIG. 2 illustrates an example of using components of the example environment of FIG. 1 to generate and use interpretable embeddings in a larger context.

FIG. 2 schematically depicts one example of how an interpretable embedding 244 may be generated from a data sample 236 and processed in a larger context. Data sample 236 may be obtained by data engine 122. In some implementations, data sample 236 may be preprocessed by data engine 122 and/or by embedding engine 132 (as depicted in FIG. 1) in accordance with a first dimensionality reduction process ("D.R.P." in FIG. 2) 238 and a second dimensionality reduction process 240.

First dimensionality process 238 may be a conventional dimensionality reduction process such as an encoder portion of an autoencoder, a PCA process, a t-SNE process, etc., that generates a latent embedding 246 that represents data sample 236. In some implementations, latent embedding 246 may be generated from an upstream one-hot vector (not depicted) that was assembled based on data sample 236. First dimensionality reduction process 238 may be a "black box" process that is not readily interpretable by a human. Consequently, individual dimensions of latent embedding 246 also may not have readily identifiable semantic meanings (hence the term "latent"). As indicated by the ellipses, latent embedding 246 may include any number of dimensions.

Second dimensionality process 240 may process data sample 236 in accordance with a plurality of distinct semantic queries to generate interpretable embedding 244. The dimensions of interpretable embedding 244, represented by white circles in FIG. 2, may correspond to numeric solutions to the distinct semantic queries about data sample 236. As indicated by the ellipses, interpretable embedding 244 may include any number of dimensions corresponding to any number of pairs of semantic queries and numeric solutions.

In various implementations, latent embedding 246 and interpretable embedding 244 may be combined, e.g., via concatenation or other means, to yield a combined embedding 244-246, as depicted in FIG. 2. This combined embedding 244-246 may be processed with one or more downstream processes for various purposes. In FIG. 2, for instance, a first downstream process 250 maps or encodes combined embedding 244-246 to a reduced dimensionality combined embedding 248 that represents, in a reduced dimension form, both latent embedding 246 (as indicated by its shaded circles) and interpretable embedding 244 (as indicated by its white circles). A second downstream process 252 maps or decodes reduced dimensionality combined embedding 248 to decoded latent embedding 246' and decoded interpretable embedding 244'. Downstream processes 250 and 252 are shown immediately adjacent to each other for illustrative purposes, but this need not be the case in all instances, and there may be more than two downstream processes.

For purposes of debugging, decoded latent embedding 246' may be compared to the original latent embedding 246. To the extent decoded latent embedding 246' differs from original latent embedding 246, that may indicate that one or more of downstream processes 250-252 exhibits some error. However, because individual dimensions of decoded latent embedding 246 are not interpretable semantically, it may be difficult to debug the source of the error.

Similarly, decoded interpretable embedding 244' may be compared to original interpretable embedding 244. As before, to the extent decoded interpretable embedding vector 244' differs from original interpretable embedding 244, that may indicate that one or more of downstream processes 250-252 exhibits some error. However, because individual dimensions of decoded interpretable embedding 244 are semantically-interpretable, the task of debugging may be more straight-forward and/or efficient than if only decoded latent embedding 246' were available.

Figure 3:
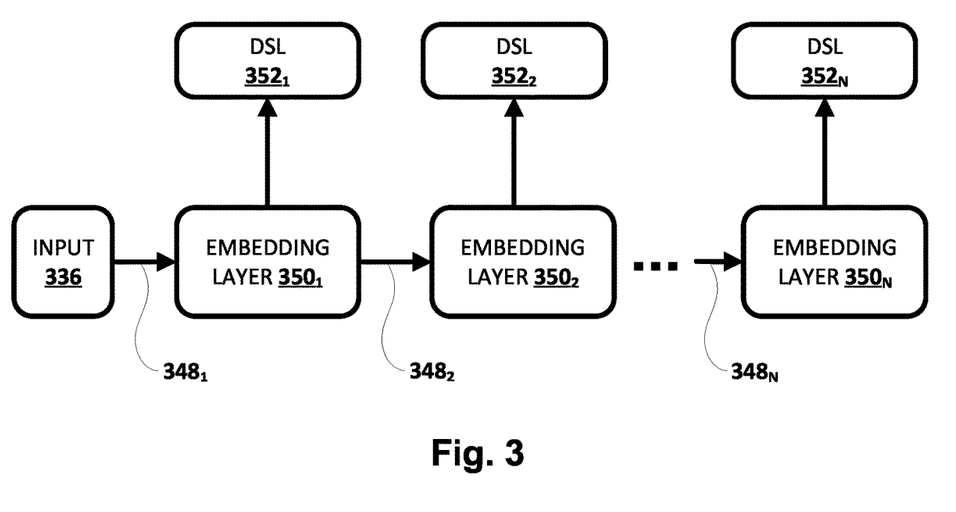
FIG. 3 illustrates an example of leveraging techniques described herein to facilitate generation of domain-specific languages.

FIG. 3 depicts one example of how techniques described herein may be leveraged to aid in the understanding of a machine learning pipeline (e.g., a neural network architecture), for debugging purposes or otherwise. In FIG. 3, an input data sample 336 is processed based on a series of transformations $348_{1-N}$. Each transformation 348 may be a function that is used to transform (e.g., map, encode, etc.) a vector/embedding input to a different output. Individual transformations 348 may take various forms, such as neural networks, support vector machines, etc. In some cases, at least some of series of transformations $348_{1-N}$ may correspond to iterative applications of the same machine learning model to sequential data, in which case those transformations 348 may be recurrent neural networks (e.g., long short-term memory networks, gated recurrent unit networks), transformer networks, and so forth.

Transformations $348_{1-N}$ yield respective embedding layers $350_{1-N}$. One or more of embedding layers $350_{1-N}$ may include and/or be reversibly transformable to an interpretable embedding generated in accordance with the present disclosure. Consequently, it is possible to map each embedding layer 350 to a corresponding domain specific language (DSL) 352, as depicted in FIG. 3.

Along with conventional optimization involved with training embedding layers $350_{1-N}$, an additional constraint may be imposed during training that forces transformation of each embedding layer 350 to a respective DSL 352. This could be leveraged, for instance, to explain the visual hierarchy of digital images. For example, first DSL $352_1$ may have operators/dimensions for lines, such that the inputs can all be explained with the use of lines, with as little error as possible. Second DSL $352_2$ may have operators/dimensions for basic shapes (rectangle, square, circle, rhombus, etc.). DSL $352_3$ (not depicted) may have operators/dimensions for a coloring arrangement to match the colors in the input image. And so on.

Figure 4:
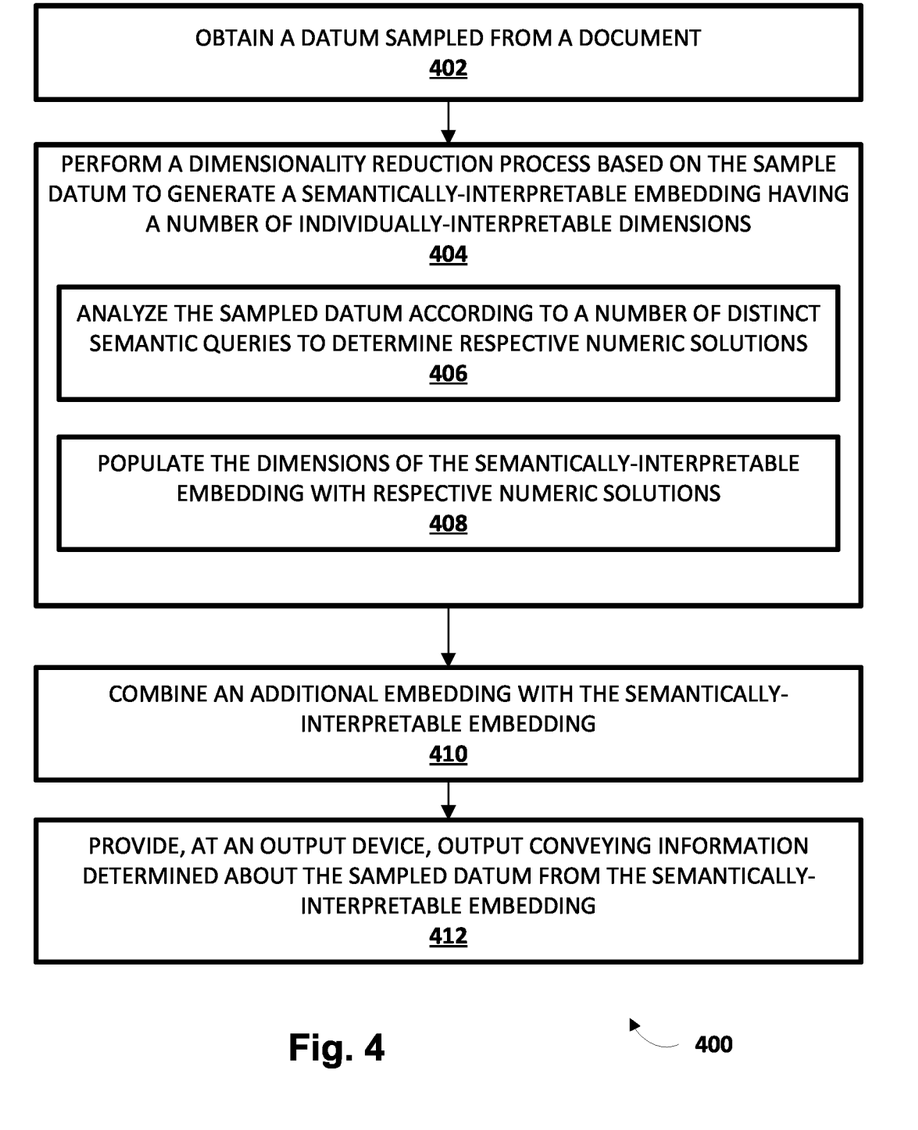
FIG. 4 is a flowchart illustrating an example method of practicing selected aspects of the present disclosure, according to implementations disclosed herein.

FIG. 4 is a flowchart illustrating an example method 400 for generating a semantically-interpretable embedding, according to implementations disclosed herein. For convenience, the operations of the flow chart are described with reference to a system that performs the operations. This system may include various components of various computer systems, such as one or more components of interpretable embedding system 120. Moreover, while operations of method 400 are shown in a particular order, this is not meant to be limiting. One or more operations may be reordered, omitted or added.

At block 402, the system, e.g., by way of data engine 122, may obtain a datum sampled from a document. In the case of a document that includes text, this datum may take the form of a word that has been extracted as a token through a tokenization process. In the case of visual data, this datum may include, for instance, an individual frame of a video, an audio track of an audio or video file, a region of a digital image, a segmented object in a digital image, etc.

At block 404, the system, e.g., by way of data engine 122 or embedding engine 132, may perform a dimensionality reduction process (e.g., 240 in FIG. 2) based on the sampled datum to generate a semantically-interpretable embedding (e.g., 244) having a number of individually-interpretable dimensions. In some implementations, the dimensionality reduction process may include, at block 406, analyzing the sampled datum according to a number of distinct semantic queries to determine respective numeric solutions. In various implementations, the number of distinct semantic queries corresponds to the number of individually-interpretable dimensions. Each numeric solution may offer an inconclusive clue about the sampled datum, such as a probability a word is used in a particular literature category, the probability an image depicts a mammal, etc. The dimensionality reduction process may also include, at block 408, populating the dimensions of the semantically-interpretable embedding with respective numeric solutions.

In some implementations, at optional block 410, the system may combine an additional embedding, such as latent embedding 246 in FIG. 2, with the interpretable embedding (e.g., 244 in FIG. 2) to yield a combined embedding (e.g., 244-246 in FIG. 2). The additional embedding may include latent data that is generated based on, for instance, a one-hot vector representing the data sample, and using a different dimensionality reduction process (e.g., autoencoder, PCA, t-SNE). This combined embedding may be useful when later debugging a process that relies on the semantically-interpretable embedding. For example, the debugging process may include decoding a downstream encoding (e.g., 248 in FIG. 2) of the additional embedding (e.g., 246 in FIG. 2) and semantically-interpretable embedding (e.g., 244 in FIG. 2) to reconstruct the numeric solutions. The downstream encoding (e.g., 248 in FIG. 2) may have fewer dimensions than the combined additional embedding and semantically-interpretable embedding.

At block 412, the system may provide, at an output device, output conveying information determined about the sampled datum from the semantically-interpretable embedding. For example, the system may output one or more of the semantic queries corresponding to one or more of the dimensions of the interpretable embedding, along with corresponding numeric solutions. In some implementations, the system may map the interpretable embedding to a DSL (e.g., $352_{1-N}$ in FIG. 3), in which case the output may be a statement or other representation in the DSL.

Figure 5:
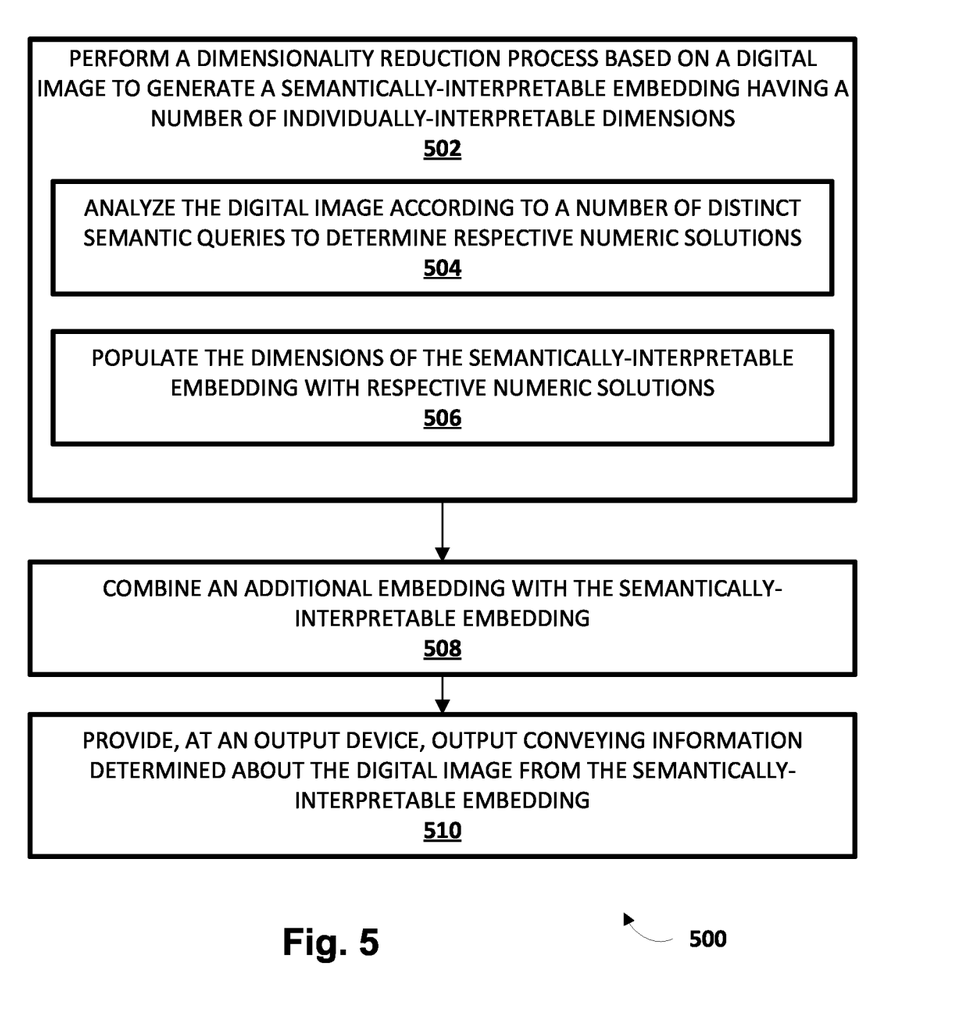
FIG. 5 is a flowchart illustrating another example method of practicing selected aspects of the present disclosure, according to implementations disclosed herein.

FIG. 5 is a flowchart illustrating another example method 500 for generating a semantically-interpretable embedding, according to implementations disclosed herein. For convenience, the operations of the flow chart are described with reference to a system that performs the operations. This system may include various components of various computer systems, such as one or more components of interpretable embedding system 120. Moreover, while operations of method 500 are shown in a particular order, this is not meant to be limiting. One or more operations may be reordered, omitted or added. The operations of method 500 are similar to those of method 400, except that in FIG. 5, the input is a digital image (e.g., standalone or a video frame), rather than a datum sampled from a document.

At block 502, the system may perform a dimensionality reduction process using a digital image to generate a semantically-interpretable embedding having a number of individually-interpretable dimensions. Similar to method 406, in various implementations, the dimensionality reduction process may include, at block 504, analyzing the digital image according to a number of distinct semantic queries to determine respective numeric solutions. Once again, the number of distinct semantic queries may correspond to the number of individually-interpretable dimensions, and each numeric solution may offer an inconclusive clue about what is depicted in the image.

In some implementations, these numeric solutions may be determined in real time, e.g., using coarse object recognition and/or other analysis to determine a broad category of the subject of the digital image. For example, various types of machine learning models and/or other image analysis algorithms may be employed to determine coarse numeric solutions indicative of, for instance, one or more statistics about one or more colors of a subject depicted in the digital image, one or more categories of a subject depicted in the digital image (e.g., land-based animal versus water based, living versus non-living, etc.), one or more physical characteristics of a subject depicted in the digital image (e.g., how many appendages, how much fur, etc.), and/or an estimated size of a subject depicted in the digital image, to name a few.

At block 506, the system may populate the dimensions of the semantically-interpretable embedding with respective numeric solutions. In some implementations, at block 508, the system may combine an additional embedding with the semantically-interpretable embedding, similar to block 410 in FIG. 4. In other implementations, the interpretable embedding may be processed on its own. At block 510, similar to block 412 of FIG. 4, the system may provide, at an output device, output conveying information determined about the digital image from the semantically-interpretable embedding.

Figure 6:
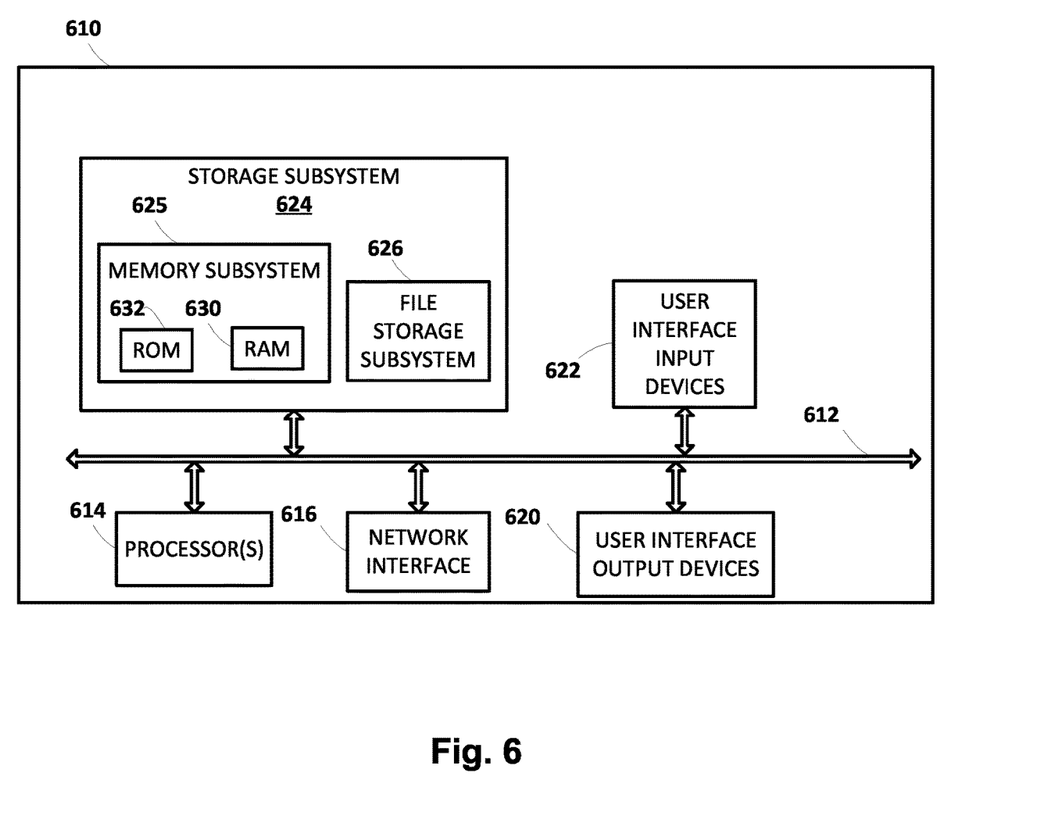
FIG. 6 illustrates an example architecture of a computing device.

FIG. 6 is a block diagram of an example computing device 610 that may optionally be utilized to perform one or more aspects of techniques described herein. In some implementations, one or more of the client computing devices $106_{1-N}$, privacy status system 120, and/or other component(s) may comprise one or more components of the example computing device 610.

Computing device 610 typically includes at least one processor 614 which communicates with a number of peripheral devices via bus subsystem 612. These peripheral devices may include a storage subsystem 624, including, for example, a memory subsystem 625 and a file storage subsystem 626, user interface output devices 620, user interface input devices 622, and a network interface subsystem 616. The input and output devices allow user interaction with computing device 610. Network interface subsystem 616 provides an interface to outside networks and is coupled to corresponding interface devices in other computing devices.

User interface input devices 622 may include a keyboard, pointing devices such as a mouse, trackball, touchpad, or graphics tablet, a scanner, a touch screen incorporated into the display, audio input devices such as voice recognition systems, microphones, and/or other types of input devices. In general, use of the term "input device" is intended to include all possible types of devices and ways to input information into computing device 610 or onto a communication network.

User interface output devices 620 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 610 to the user or to another machine or computing device.

Storage subsystem 624 stores programming and data constructs that provide the functionality of some or all of the modules described herein. For example, the storage subsystem 624 may include the logic to perform selected aspects of the methods 400 and 500 of FIGS. 4 and 5.

These software modules are generally executed by processor 614 alone or in combination with other processors. Memory 625 used in the storage subsystem 624 can include a number of memories including a main random access memory (RAM) 630 for storage of instructions and data during program execution and a read only memory (ROM) 632 in which fixed instructions are stored. A file storage subsystem 626 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 626 in the storage subsystem 624, or in other machines accessible by the processor(s) 614.

Bus subsystem 612 provides a mechanism for letting the various components and subsystems of computing device 610 communicate with each other as intended. Although bus subsystem 612 is shown schematically as a single bus, alternative implementations of the bus subsystem may use multiple busses.

Computing device 610 can be of varying types including a workstation, server, computing cluster, blade server, server farm, or any other data processing system or computing device. Due to the ever-changing nature of computers and networks, the description of computing device 610 depicted in FIG. 6 is intended only as a specific example for purposes of illustrating some implementations. Many other configurations of computing device 610 are possible having more or fewer components than the computing device depicted in FIG. 6.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method for generating an explanation of a visual hierarchy of a digital image, the method implemented using one or more processors and comprising:
processing the digital image using at least part of a machine learning pipeline to yield a first latent embedding layer representation of the digital image;
using the first latent embedding layer, generating a first semantically-interpretable embedding having a number of individually-interpretable dimensions, including populating the dimensions of the first semantically-interpretable embedding with respective probabilities of visual features of a first level of granularity being present in the digital image;
processing the first latent embedding layer using at least part of the machine learning pipeline to yield a second latent embedding layer representation of the digital image;
using the second latent embedding layer, generating a second semantically-interpretable embedding having a number of individually-interpretable dimensions, including populating the dimensions of the second semantically-interpretable embedding with respective probabilities of visual features of a second level of granularity being present in the digital image;
processing the second latent embedding layer using at least part of the machine learning pipeline to yield a third latent embedding layer representation of the digital image; and
using the third latent embedding layer, generating a third semantically-interpretable embedding having a number of individually-interpretable dimensions, including populating the dimensions of the third semantically-interpretable embedding with respective probabilities of visual features of a third level of granularity being present in the digital image.

2. The method of claim 1, wherein the second level of granularity is greater than the first level of granularity.

3. The method of claim 2, wherein the third level of granularity is greater than the second level of granularity.

4. The method of claim 3, wherein the visual features of the first level of granularity include lines.

5. The method of claim 4, wherein the visual features of the second or third level of granularity include one or more shapes selected from rectangles, squares, circles, and rhombuses.

6. The method of claim 4, wherein the visual features of the second or third level of granularity include colors.

7. A system for generating an explanation of a visual hierarchy of a digital image, the system comprising one or more processors and memory storing instructions that, in response to execution of the instructions by the one or more processors, cause the one or more processors to:
process the digital image using at least part of a machine learning pipeline to yield a first latent embedding layer representation of the digital image;
perform a dimensionality reduction process using the digital image to generate the first latent embedding layer, generating a first semantically-interpretable embedding having a number of individually-interpretable dimensions, including populating the dimensions of the first semantically-interpretable embedding with respective probabilities of visual features of a first level of granularity being present in the digital image;
process the first latent embedding layer using at least part of the machine learning pipeline to yield a second latent embedding layer representation of the digital image;
using the second latent embedding layer, generate a second semantically-interpretable embedding having a number of individually-interpretable dimensions, including populating the dimensions of the second semantically-interpretable embedding with respective probabilities of visual features of a second level of granularity being present in the digital image;
process the second latent embedding layer using at least part of the machine learning pipeline to yield a third latent embedding layer representation of the digital image; and
using the third latent embedding layer, generate a third semantically-interpretable embedding having a number of individually-interpretable dimensions, including populating the dimensions of the third semantically-interpretable embedding with respective probabilities of visual features of a third level of granularity being present in the digital image.

8. The system of claim 7, wherein the second level of granularity is greater than the first level of granularity.

9. The system of claim 8, wherein the third level of granularity is greater than the second level of granularity.

10. The system of claim 9, wherein the visual features of the first level of granularity include lines.

11. The system of claim 10, wherein the visual features of the second or third level of granularity include one or more shapes selected from rectangles, squares, circles, and rhombuses.

12. The system of claim 10, wherein the visual features of the second or third level of granularity include colors.

13. At least one non-transitory computer-readable medium for generating an explanation of a visual hierarchy of a digital image, the medium comprising instructions that, in response to execution of the instructions by one or more processors, cause the one or more processors to:
process the digital image using at least part of a machine learning pipeline to yield a first latent embedding layer representation of the digital image;
perform a dimensionality reduction process using the digital image to generate the first latent embedding layer, generating a first semantically-interpretable embedding having a number of individually-interpretable dimensions, including populating the dimensions of the first semantically-interpretable embedding with respective probabilities of visual features of a first level of granularity being present in the digital image;
process the first latent embedding layer using at least part of the machine learning pipeline to yield a second latent embedding layer representation of the digital image;
using the second latent embedding layer, generate a second semantically-interpretable embedding having a number of individually-interpretable dimensions, including populating the dimensions of the second semantically-interpretable embedding with respective probabilities of visual features of a second level of granularity being present in the digital image;
process the second latent embedding layer using at least part of the machine learning pipeline to yield a third latent embedding layer representation of the digital image; and
using the third latent embedding layer, generate a third semantically-interpretable embedding having a number of individually-interpretable dimensions, including populating the dimensions of the third semantically-interpretable embedding with respective probabilities of visual features of a third level of granularity being present in the digital image.

14. The at least one non-transitory computer-readable medium of claim 13, wherein the second level of granularity is greater than the first level of granularity.

15. The at least one non-transitory computer-readable medium of claim 14, wherein the third level of granularity is greater than the second level of granularity.

16. The at least one non-transitory computer-readable medium of claim 15, wherein the visual features of the first level of granularity include lines.

17. The at least one non-transitory computer-readable medium of claim 16, wherein the visual features of the second or third level of granularity include one or more shapes selected from rectangles, squares, circles, and rhombuses.

18. The at least one non-transitory computer-readable medium of claim 16, wherein the visual features of the second or third level of granularity include colors.

\* \* \* \* \*

UNITED STATES PATENT AND TRADEMARK OFFICE
CERTIFICATE OF CORRECTION

| | | |
|---|---|---|
| PATENT NO. | : 12,400,078 B1 | Page 1 of 1 |
| APPLICATION NO. | : 17/706303 | |
| DATED | : August 26, 2025 | |
| INVENTOR(S) | : Vyas et al. | |

It is certified that error appears in the above-identified patent and that said Letters Patent is hereby corrected as shown below:

On the Title Page

Item (73)
Should read: X Development LLC, Mountain View, CA (US)

Signed and Sealed this
Twenty-fifth Day of November, 2025

John A. Squires
*Director of the United States Patent and Trademark Office*